(Specimens.)

J. H. REYNOLDS.
WINDOW GLASS.

No. 419,882. Patented Jan. 21, 1890.

Witnesses
Alonzo M. Luther.
John C. Geary.

Inventor
John H. Reynolds.
By his Attorney
Frank H. Allen.

UNITED STATES PATENT OFFICE.

JOHN H. REYNOLDS, OF NEW LONDON, CONNECTICUT.

WINDOW-GLASS.

SPECIFICATION forming part of Letters Patent No. 419,882, dated January 21, 1890.

Application filed April 27, 1889. Serial No. 308,873. (Specimens.)

*To all whom it may concern:*

Be it known that I, JOHN H. REYNOLDS, a citizen of the United States, residing in the city and county of New London, and State of Connecticut, have invented a certain new and useful Improvement in Window-Glass, which improvement is fully set forth and described in the following specification, reference being had to the accompanying sheet of drawings, in which—

Figure 1:
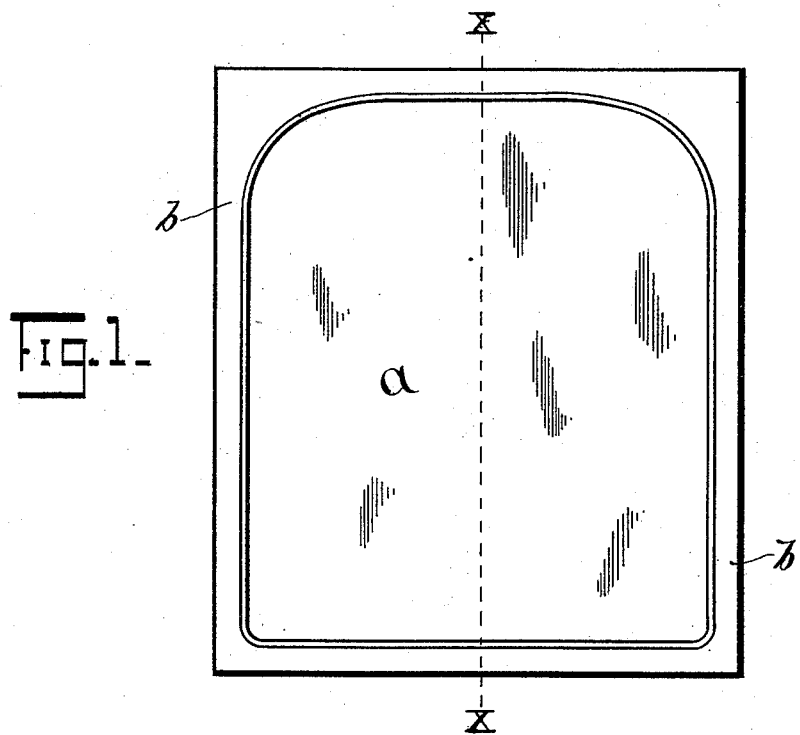
Figure 2:
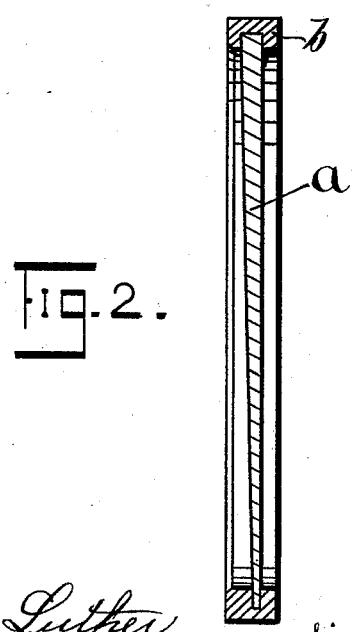

Figure 1 is a face view of a glass of my improved form suitably supported in an inclosing-frame, and Fig. 2 is a cross-section of the same on line $x\ x$.

My present invention has for its object the improvement of window-glass, to the end that all the desirable qualities of heavy plate-glass may be attained without the weight and expense heretofore necessary.

Referring to the annexed drawings, the letter $a$ indicates a sheet of glass of my new form. Said glass is made at one edge (the upper, as here shown) of or about the same thickness of ordinary plate-glass as now used for windows, while the opposite edge is very much thinner, thus providing a sheet or plate that diminishes gradually and uniformly in thickness from one edge to the opposite edge, as illustrated in Fig. 2 of the drawings. This form reduces the weight of the plate twenty-five per cent. or more, according to the bevel, and allows a corresponding saving in stock, yet retains all the clearness and nearly all the strength of plate-glass of uniform thickness.

Plates of glass of the described beveled form may be readily produced in the following manner: Before pouring the molten glass onto the casting-table, said table is blocked up or otherwise elevated slightly at one side or end, thus throwing the bed of said table out of a horizontal plane. When the molten glass is poured, its upper surface naturally settles down to a horizontal plane or level, thus producing a casting or plate one of whose ends is of greater thickness than the opposite end. The plate thus formed is "rolled down" and finished in the usual manner. Plates so formed are especially valuable for use in store-windows and in other exposed places. In such cases the plate is framed with its thick end downward, thus bringing the thickest and strongest portion of said plate where it is most likely to be accidentally injured.

In mounting or framing such beveled plates for use as windows a frame $b$ is provided, having a rabbet or channel that is of the same bevel or pitch as the glass, so that when said glass is entered in and surrounded by said frame the glass is as perfectly supported as an ordinary sheet in a frame with a rabbet of uniform with. (See Fig. 2.)

I am aware that glass with beveled edges forming an ornamental border has been commonly used heretofore, and therefore make no claim to such a construction.

What I do claim as of my invention, and wish to secure by Letters Patent, is—

As a new article of manufacture, a plate of window-glass diminishing uniformly in thickness from one edge to the opposite edge, as and for the objects specified.

JOHN H. REYNOLDS.

Witnesses:
ALONZO M. LUTHER,
JOHN C. GEARY.